(12) United States Patent
Yang

(10) Patent No.: US 7,061,779 B2
(45) Date of Patent: Jun. 13, 2006

(54) POWER FACTOR CORRECTION CIRCUIT

(75) Inventor: Lee-Lung Yang, Chu Pei (TW)

(73) Assignee: Entrust Power Co., Ltd. (TW)

( * ) Notice: Subject to any disclaimer, the term of this patent is extended or adjusted under 35 U.S.C. 154(b) by 126 days.

(21) Appl. No.: 10/814,231

(22) Filed: Apr. 1, 2004

(65) Prior Publication Data

US 2005/0219869 A1    Oct. 6, 2005

(51) Int. Cl.
*H02M 3/335* (2006.01)
(52) U.S. Cl. .................................... 363/21.04
(58) Field of Classification Search ............... 363/20, 363/21.01, 21.04, 95, 97
See application file for complete search history.

(56) References Cited

U.S. PATENT DOCUMENTS

| | | | |
|---|---|---|---|
| 6,314,002 B1 * | 11/2001 | Qian et al. | 363/21.04 |
| 6,473,318 B1 * | 10/2002 | Qian et al. | 363/21.16 |
| 6,714,425 B1 * | 3/2004 | Yamada et al. | 363/21.12 |
| 2004/0151009 A1 * | 8/2004 | Yang | 363/21.08 |

* cited by examiner

*Primary Examiner*—Adolf Berhane
(74) *Attorney, Agent, or Firm*—Hoffman, Wasson & Gitler

(57) ABSTRACT

A power factor correction circuit structure is described. The power factor correction circuit comprises a series connection of a first winding, a diode, an inductor and a first capacitor. The polarity of the first winding is opposite to that of the primary winding. A second capacitor is connected to the primary winding to control the primary winding and build a voltage across the first capacitor. This voltage is transferred to the first winding through the transformer to boost the first capacitor voltage and improve the power factor.

13 Claims, 6 Drawing Sheets

POWER FACTOR CORRECTION CIRCUIT

FIELD OF THE INVENTION

The present invention relates to a power factor correction circuit and more particularly, to a power factor correction circuit for improving a power factor of a switching power supply designed in flyback topologies in order to comply with the requirements of Class A or Class D as stipulated in the harmonic current rules EN-6100-3-2.

BACKGROUND OF THE INVENTION

A typical switching power supply is shown in FIG. 1. The supply comprises an AC/DC rectifier 1 and a DC/DC converter 2 in which an electrolytic capacitor $C_3$ is connected as a filter for the bridge rectifier $BD_1$.

FIG. 5 discloses a circuit structure in which the DC/DC converter 2 shown in FIG. 1 is a half-bridge converter. In accordance with the design structure shown in FIG. 5, a bridge rectifier $BD_1$ is used to rectify the AC power $V_{S1}$. A capacitor $C_3$ is then used to filter the rectified power and generates a DC voltage $V_{C3}$. The capacitor $C_1$ and the capacitor $C_2$ are connected to a common node to form a voltage divider. Therefore, the voltage at the common node between the two capacitors is $V_{C3}/2$.

FIG. 6 is a time chart for the PWM signals, $V_{HG}$ and $V_{LG}$, which are driving signals for the switches $Q_1$ and $Q_2$ shown in FIG. 5, respectively. Both PWM signals $V_{HG}$ and $V_{LG}$ are low (low voltage) for $0 \leq t \leq t_1$, at which time the switches $Q_1$ and $Q_2$ are both turned off. Therefore, the output voltage $V_O$ is supplied by the capacitor $C_4$.

When $t_1 \leq t \leq t_2$, the PWM signal $V_{LG}$ is high (high voltage) and the PWM signal $V_{HG}$ is low (low voltage), at which time the switch $Q_1$ is turned off and the switch $Q_2$ is turned on. The current then flows through the capacitor $C_1$, the primary winding $P_1$ and the switch $Q_2$ to the ground. In this situation, the transformer transfers the power from the primary winding $P_1$ to the secondary winding $S_1$ to supply power to the capacitor $C_4$ and output a voltage $V_O$.

When $t_2 \leq t \leq t_3$, the switches $Q_1$ and $Q_2$ are once again both turned off, making the operation state of the circuit the same as that when $0 \leq t \leq t_1$.

When $t_3 \leq t \leq t_4$, the PWM signal $V_{LG}$ is low (low voltage) and the PWM signal $V_{HG}$ is high (high voltage), at which time the switch $Q_1$ is turned on and the switch $Q_2$ is turned off. The current then flows through the switch $Q_1$, the primary winding $P_1$ and the capacitor $C_2$ to the ground. The transformer transfers the power from the primary winding $P_1$ to the secondary winding $S_2$ to supply power to the capacitor $C_4$ and output a voltage $V_O$.

The power switching cycle described above is performed repeatedly to supply power to a load while the output voltage $V_O$ is transferred to a feedback system 12. The feedback system 12 feeds a signal back to the high-frequency pulse signal control circuit 50 to modify the duty cycle of the PWM signals $V_{HG}$ and $V_{LG}$. For example, if the power supplied to the load is insufficient when the output voltage is lower than a required value, the feedback signal lengthens the duty cycle of the PWM signals $V_{HG}$ and $V_{LG}$ to increase the conduction time of the switches $Q_1$ and $Q_2$. In effect, power is transferred from the primary winding to the secondary winding of the transformer $T_1$ for a longer period of time; that is, the power supplied to the secondary winding is increased. The output voltage $V_O$ consequently increases to attain the required voltage. This means, however, that the power supplied to the load is overdriven when the output voltage is higher than the required value. In this situation, the duty cycle of the PWM signals $V_{HG}$ and $V_{LG}$ should be reduced.

Note that the input current $I_{pc}$ in FIG. 5 is a pulse current as shown in the graph of FIG. 2. The power factor of the conventional switching power supply is significantly decreased (typically by about 50%) due to the distorted input current, causing the total harmonics distortion (hereinafter referred to as THD) to exceed 100% after the rectification performed by the AC/DC rectifier 1 shown in FIG. 1. As a result, the total harmonics is seriously distorted, the quality is poor, and worse yet, precious energy is wasted.

Thus, many countries have promulgated a number of harmonic current rules (e.g., EN-6100-3-2) which specify the current wave shape for power supplies that must be obeyed by manufacturers in order to improve the efficiency and quality of the power source being supplied.

As such, various designs of power factor correction circuits have been proposed by researchers in order to improve the power factor of the conventional switching power supply. Two examples of typical prior art are described in the following:

1. Inductor-Type Power Factor Correction Circuit

As shown in FIG. 3, the prior art discloses a design in which a low frequency large winding $L_1$ is in series between a bridge rectifier $BD_1$ and an electrolytic capacitor $C_1$. The winding $L_1$ and the capacitor $C_1$ form a low pass filter to rectify the input current of a DC/DC converter 2. Such a design is similar in function to the ballast for correcting the power factor of a fluorescent lamp. However, the winding $L_1$ is relatively large, has only a limited power factor improvement, and creates an abnormally high temperature during operation.

2. Active-Type Power Factor Correction Circuit

As shown in FIG. 4, the prior art discloses a design in which the AC/DC rectifier is redesigned to form a two-stage circuit with the DC/DC converter 2. Further, a complex control circuit 11 and a large switch element $Q_1$ are added therein to improve the power factor. However, it is relatively complex in circuit design and is expensive to manufacture.

Many power factor correction circuits have been developed based on the basic concepts involved in the two examples of prior art mentioned above, all with similar drawbacks.

SUMMARY OF THE INVENTION

In accordance with the foregoing description, there are many drawbacks to the conventional power factor correction circuit. For example, the circuit structure depicted in FIG. 3 is relatively large, while the circuit structure depicted in FIG. 4 is relatively complex in circuit design and is expensive to manufacture.

Therefore, the main purpose of the present invention is to provide a power factor correction circuit with a high power factor.

Another purpose of the present invention is to provide a power factor correction circuit that solves the problems existing in the prior art.

A further purpose of the present invention is to provide a switching power supply structure that is small and economical to manufacture.

It is an objective of the present invention to provide a power factor correction circuit comprising a series connection of a first winding, a diode, an inductor and a first capacitor. The inductor is used to filter the voltage from the diode. The first winding can be one additional winding of the transformer. A primary winding is connected at a point between the inductor and the first capacitor. The polarity of the first winding is opposite to that of the primary winding. A second capacitor is connected to the primary winding to control the primary winding and build a voltage across the first capacitor. This voltage is transferred to the first winding through the transformer. The transferred voltage can boost the first capacitor voltage to improve the power factor.

BRIEF DESCRIPTION OF THE DRAWINGS

The foregoing aspects and many of the attendant advantages of this invention will become more readily appreciated and better understood by referencing the following detailed description, when taken in conjunction with the accompanying drawings, wherein.

DETAILED DESCRIPTION OF THE PREFERRED EMBODIMENT

Without limiting the spirit and scope of the present invention, the circuit structure proposed in the present invention is illustrated with one preferred embodiment. One with ordinally skill in the art, upon acknowledging the embodiment, can apply the power factor correction circuit structure of the present invention to various switching power supplies. The circuit structure of the present invention allows a high power factor and a relatively small volume. Furthermore, the present invention does not require an additional inductor nor an additional power factor correction clock. Therefore, the size of the circuit structure is reduced and the manufacturing cost is also reduced. The application of the present invention is not limited by the preferred embodiment described in the following.

The present invention provides a circuit structure including a power factor correction circuit and a switching power supply.

Figure 1:
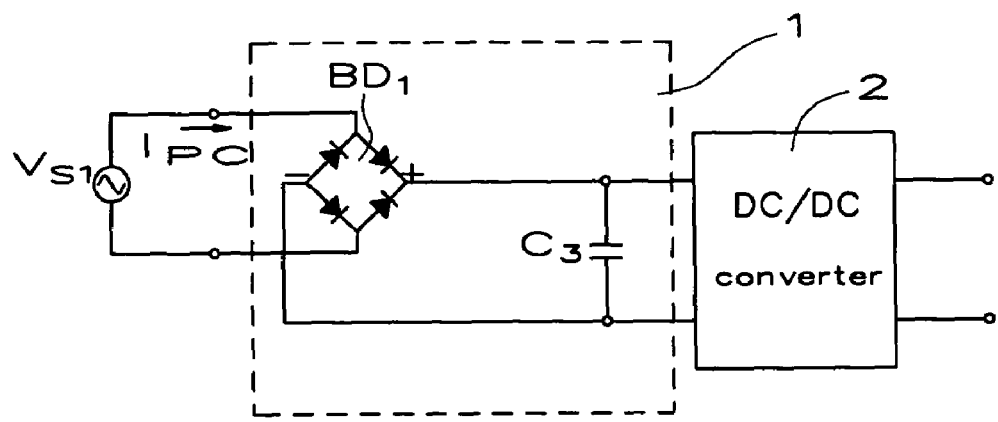
FIG. 1 is a circuit diagram of a prior art off-line switching power supply.
Figure 2:
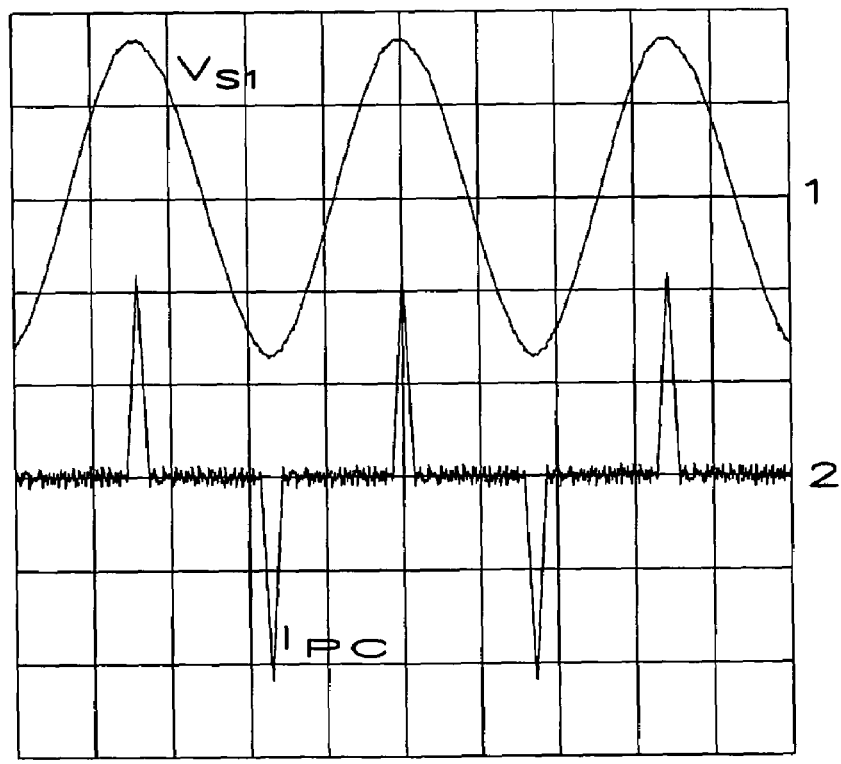
FIG. 2 is a graph showing the wave pattern of the input voltage versus the input current of FIG. 1.
Figure 3:
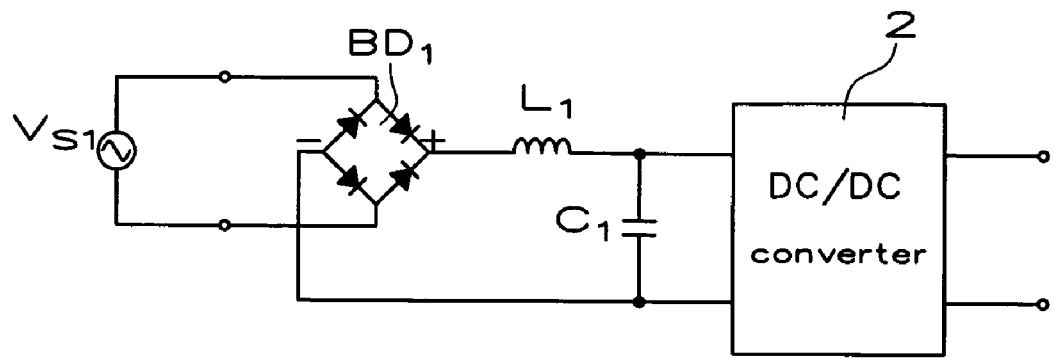
FIG. 3 is a circuit diagram of an inductor-type power factor correction circuit according to the prior art.
Figure 4:
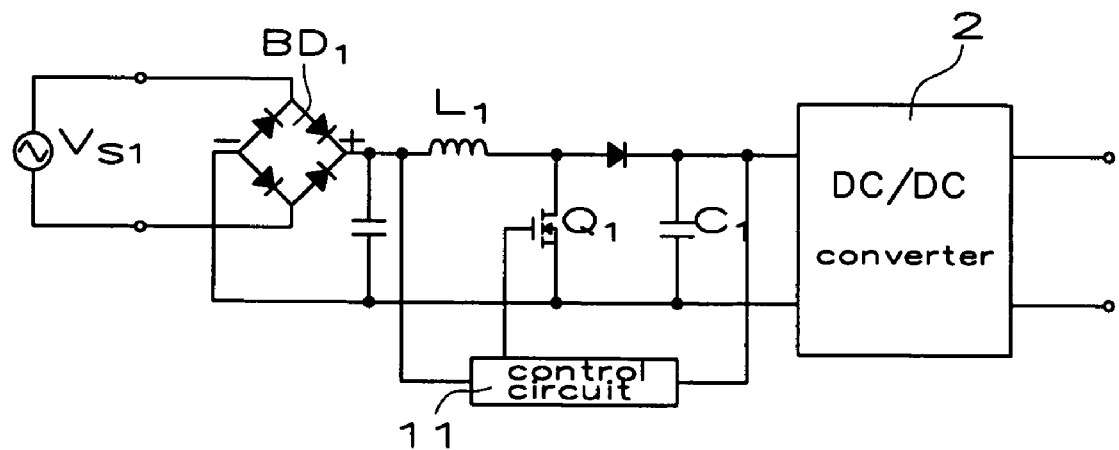
FIG. 4 is a circuit diagram of an active-type power factor correction circuit according to the prior art.
Figure 5:
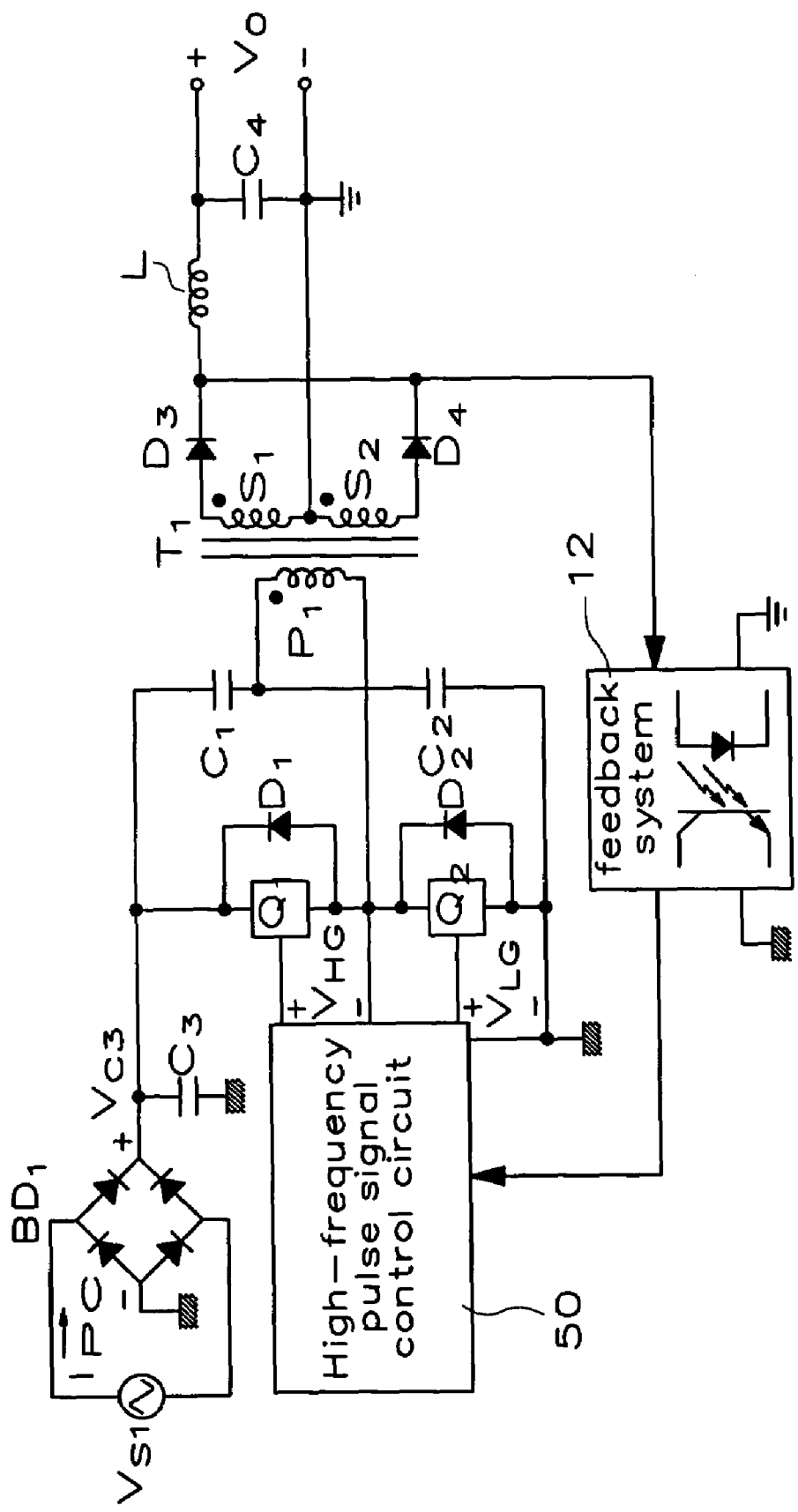
FIG. 5 is a circuit diagram of a switching power supply designed with half-bridge topology according to the prior art.
Figure 6:
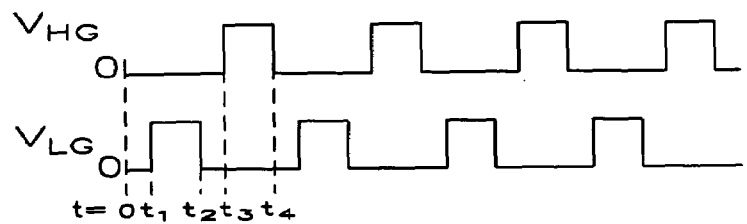
FIG. 6 is a timing diagram of the PWM signals, $V_{HG}$ and $V_{LG}$, which are usually used to drive the switching devices in conventional bridge converters.
Figure 7:
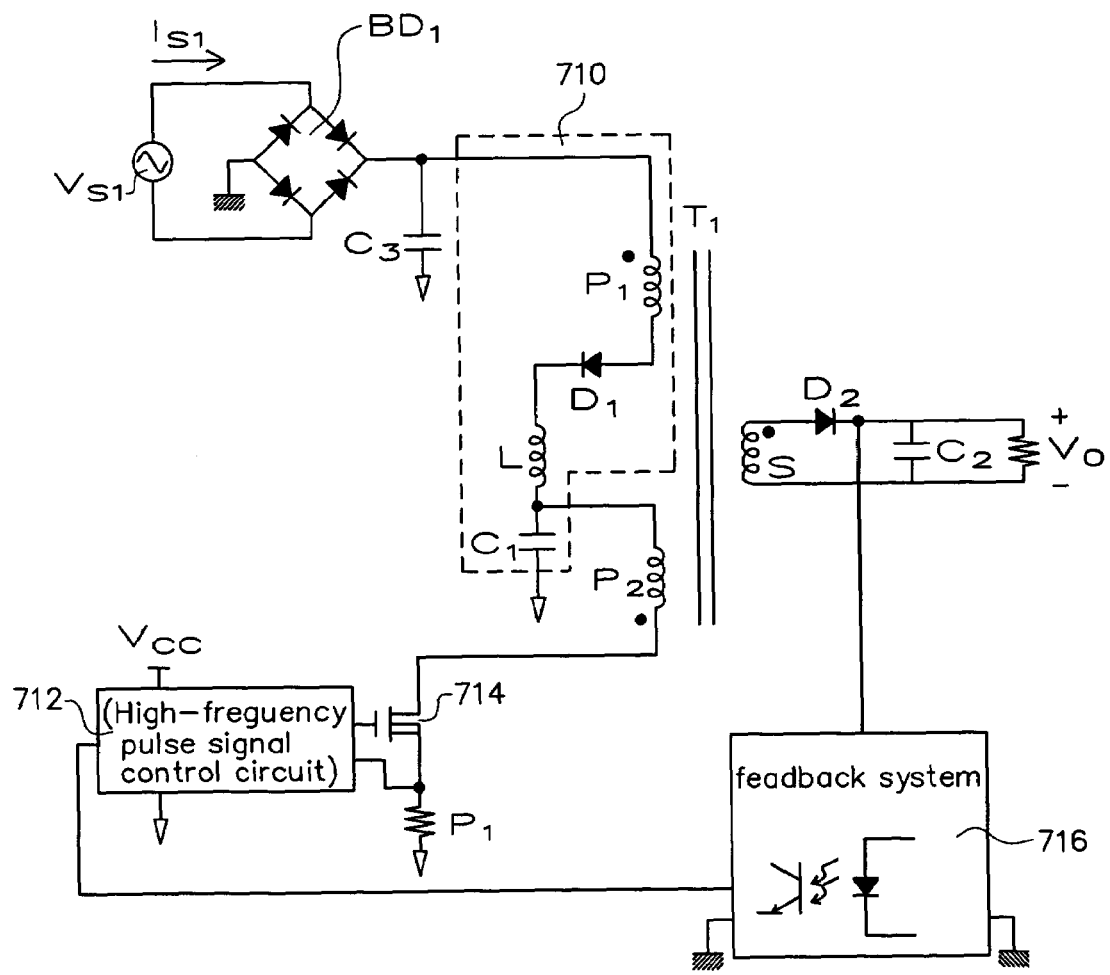
FIG. 7 illustrates an active-type power factor correction circuit used in a flyback-type switching power supply according to the preferred embodiment of the present invention.

FIG. 7 illustrates an active-type power factor correction circuit used in a flyback-type switching power supply according to the preferred embodiment of the present invention. It is noticed that the power factor correction circuit of the present invention also can be used in another type of converter, such as the forward-type, push-pull-type, half-bridge-type-, full-bridge-type or resistor-capacitor-control type.

In FIG. 7, the transformer $T_1$ has a primary winding $P_1$, a secondary winding S and an additional winding $P_1$ of the power factor correction circuit 710. The power factor correction circuit 710 is used to improve a power factor of a switching power supply. The voltage $V_{S1}$ is the AC input power. The current $I_{S1}$ is the current generated by the AC input power. The bridge rectifier $BD_1$ rectifies the AC power to DC power. The capacitor $C_3$ is used to filter the noise from the input end. The high-frequency pulse signal control circuit 712 outputs the PWM signal to control the switching transistor 714. The feedback system 716 receives the output signal $V_O$ that is transferred from the output end and sends out a feedback signal to the high-frequency pulse signal control circuit 712. Then, the high-frequency pulse signal control circuit 712 modulates the duty cycle of the PWM signal that is sent to the switching transistor 714 in order to steady the output signal $V_O$.

In accordance with the present invention, the power factor correction circuit 710 is composed of a winding $P_1$, a diode $D_1$, an inductor L and a capacitor $C_1$ arranged in series. The inductor L is used to filter the input voltage from the diode $D_1$. The winding $P_1$ and the primary winding $P_2$ are arranged in the same core such that they have opposite polarities. Therefore, the primary winding $P_2$ is able to transfer a voltage in the winding $P_1$ that is inverse to that of the primary winding $P_2$.

Figure 8:
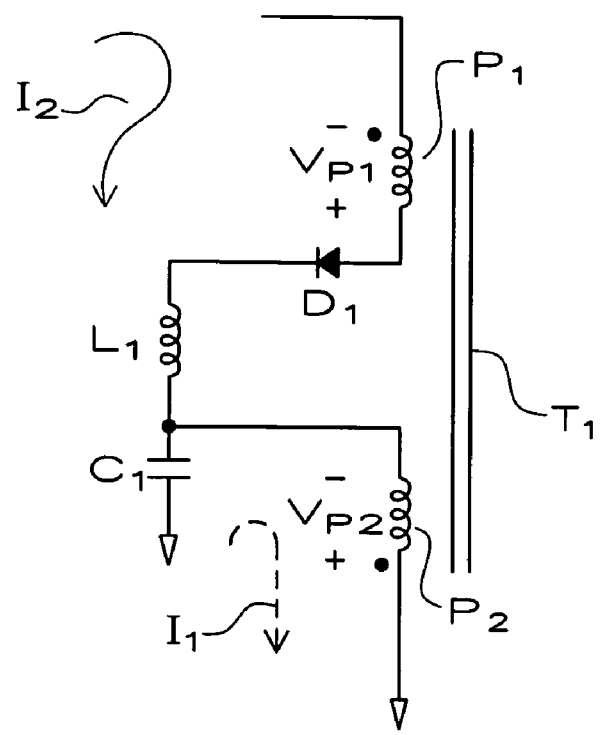
FIG. 8 illustrates a simplified circuit diagram of the primary-side circuit without showing the auxiliary power supply.
Figure 9:
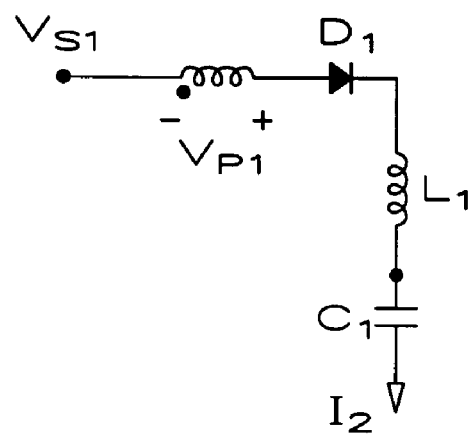
FIG. 9 illustrates an enlarged diagram of the voltage $V_{P1}$ polarity of the winding $P_1$.

Referring to FIG. 8, a simplified circuit diagram of the primary-side circuit is shown without the auxiliary power supply. The dotted line depicted in FIG. 8 represents the direction of current $I_1$ flow. When the high-frequency pulse signal control circuit turns on the switching transistor 714, the capacitor $C_1$, with an original voltage $V_{C1}$, is discharged by the current $I_1$ through the winding $P_2$. The energy is stored in the winding $P_2$ to build a voltage $V_{P2}$ in the winding $P_2$. At switching transistor 714 off, the power is transferred from the core to secondary winding S and the winding $P_1$. Then, the power is supplied to the load (not shown) and the winding $P_1$ while building a voltage $V_{P1}$ in the winding $P_1$ that is inverse to $V_{P2}$. The voltage $V_{P1}$ is related to the duty time of the switching transistor 714 when turned on and the ratings of the primary windings $P_2$ and $P_1$. The voltage $V_{P1}$ across the winding $P_1$ is shown as follows:

$$V_{P1} = V_{C1} \times \frac{P_1}{P_2} \times \text{switching transistor (turned on duty)}$$

wherein $\frac{P_1}{P_2}$ is the turns ratios of the winding $P_1$ to the primary winding $P_2$ FIG. 9 illustrates an enlarged diagram of the voltage $V_{P1}$ polarity of the winding $P_1$. The voltage $V_{S1}$ is the AC input power. Therefore, the input voltage $V_{D1}$ applied to the diode $D_1$ is shown as follows:

$$V_{D1} = V_{S1} + V_{P1}$$

When the input voltage $V_{D1}$ is larger than the voltage $V_{C1}$ of the capacitor, the diode $D_1$ is forward-biased. The diode $D_1$ is turned on and a current $I_2$ is generated. According to the preferred embodiment, the winding $P_1$ and the winding $P_2$ are designed to make the input voltage $V_{D1}$ always larger than the voltage $V_{C1}$ when the switching transistor is turned on. Referring to FIG. 8 again, the solid line indicates the direction of current $I_2$ flow. The current $I_2$ charges the capacitor $C_1$.

Figure 10:
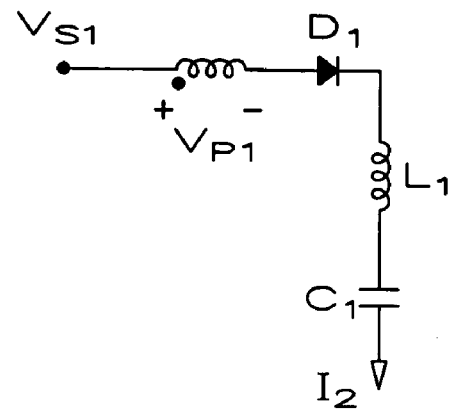
FIG. 10 illustrates another enlarged diagram of the voltage $V_{P1}$ polarity of the winding $P_1$.

When the high-frequency pulse signal control circuit turns off the switching transistor 714, the power is transferred from the core to the secondary winding $S_1$. Then, the power is supplied to the load (not shown) and the capacitor $C_2$ from the secondary winding $S_1$. At this time, the polarity of the winding $P_1$ is reversed. FIG. 10 illustrates an enlarged diagram of the voltage $V_{P1}$ polarity of the winding $P_1$. The voltage $V_{S1}$ is the AC input power. Therefore, the input voltage $V_{D1}$ applied to the diode $D_1$ is shown as follows:

$$V_{D1}=V_{S1}-V_{P1}$$

According to the preferred embodiment, the winding $P_1$ and the winding $P_2$ are designed to make the input voltage $V_{D1}$ always less than the voltage $V_{C1}$ when the switching transistor is turned off. Therefore, the diode $D_1$ is reverse-biased and no current flows through the diode $D_1$ to charge the capacitor $C_1$.

On the other hand, referring to FIG. 7 again, the output voltage $V_O$ is transferred to a feedback system. The feedback system feeds a signal back to the high-frequency pulse signal control circuit 712 to modify the duty cycle of the PWM signal. For example, if the power supplied to the load is insufficient when the output voltage is lower than the specific value, the feedback signal lengthens the duty cycle of the PWM signal to increase the time spent in turning on the switching transistor 714. In effect, power is transferred from the primary winding to the secondary winding of the transformer $T_1$ for a longer period of time; that is, the power supplied to the secondary winding is increased. The output voltage $V_O$ consequently increases to attain the required value. However, the power supplied to the load is overdriven when the output voltage is higher than the required value. In this situation, the duty cycle of the PWM signal should be reduced.

Figure 11:
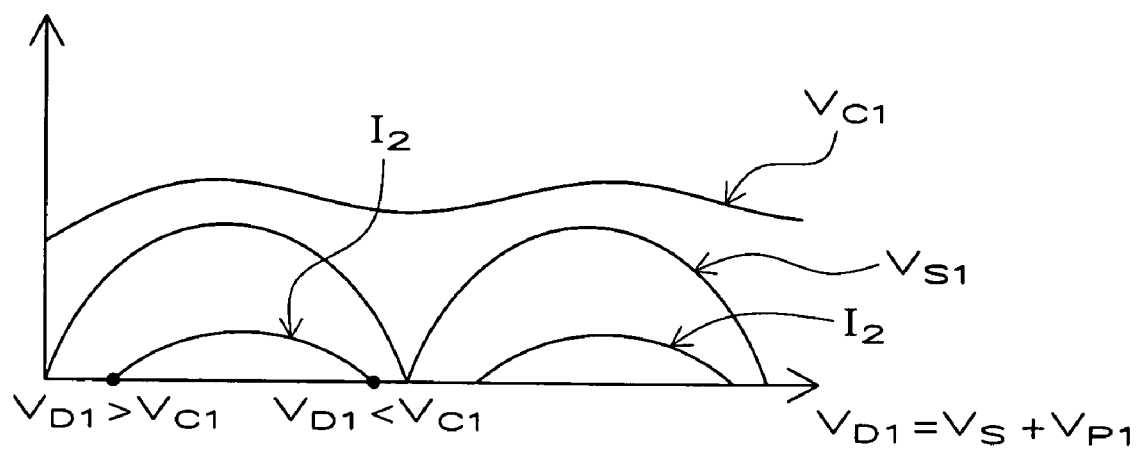
FIG. 11 is a waveform diagram showing the relationship among the critical voltages, $V_{C1}$ and $V_{S1}$, and the input current $I_2$ of the present invention.

FIG. 11 is a waveform diagram showing the relationship among the critical voltages, $V_{C1}$ and $V_{S1}$, and the input current $I_2$ of the present invention. Referring to FIG. 8 and FIG. 11, the voltage $V_{S1}$ is the AC input power. The voltage $V_{C1}$ is the voltage across the capacitor $C_1$. The current $I_2$ is the current to charge the capacitor $C_1$. The input voltage $V_{D1}$ is the voltage applied to the diode $D_1$.

Therefore, when the input voltage $V_{D1}$ is larger than the voltage $V_{C1}$ of the capacitor, the diode $D_1$ is forward-biased. The diode $D_1$ is turned on and a current $I_2$ is generated. The current $I_2$ charges the capacitor $C_1$, which can improve the power factor correction. When the input voltage $V_{D1}$ is less than the voltage $V_{C1}$ of the capacitor, the diode $D_1$ is reverse-biased. The diode $D_1$ is turned off and no current $I_2$ is generated. When the ratio of the number of the turns of the winding $P_1$ to the winding $P_2$ approaches 1, the power factor also approaches 1.

Accordingly, the present invention provides a power factor correction circuit comprising a series connection of a first winding, a diode, an inductor and a first capacitor. The first winding is one additional winding of the transformer. The polarity of the first winding is opposite to that of the primary winding. A second capacitor is connected to the primary winding to control the primary winding and build a voltage across the first capacitor. This voltage is transferred to the first winding through the transformer. The transferred voltage can boost the first capacitor voltage to improve the power factor.

As is understood by a person skilled in the art, the foregoing descriptions of the preferred embodiment of the present invention are an illustration of the present invention rather than a limitation thereof. Various modifications and similar arrangements are included within the spirit and scope of the appended claims. The scope of the claims should be accorded to the broadest interpretation so as to encompass all such modifications and similar structures. While a preferred embodiment of the invention has been illustrated and described, it will be appreciated that various changes can be made therein without departing from the spirit and scope of the invention.

What is claimed is:

1. A power factor correction circuit for improving a power factor of a switching power supply, wherein said switching power supply is composed of said power factor correction circuit and a converter with a secondary winding and a primary winding coupled with a switching device, said circuit comprising:
   a winding with an opposite polarity to said primary winding;
   a diode with a p-type side and a n-type side, wherein said p-type side is coupled with said winding;
   an inductor coupled with said n-type side of said diode; and
   a capacitor coupled with said inductor, wherein said winding, said diode, said inductor and said capacitor are coupled in series, and said capacitor and said inductor have a common node connected with said primary winding.

2. The power factor correction circuit of claim 1, wherein said inductor is used to filter noise.

3. The power factor correction circuit of claim 1, wherein said winding, said secondary winding and said primary winding are wound in a same core.

4. The power factor correction circuit of claim 1, wherein the ratio of the number of the turns of said winding to said primary winding approaches 1.

5. The power factor correction circuit of claim 1, wherein said switching device controls said capacitor to charge said primary winding.

6. The power factor correction circuit of claim 1, wherein said capacitor is charged when said diode is forward-biased.

7. The power factor correction circuit of claim 1, wherein a power is transferred to said secondary winding through said primary winding when said diode is reverse-biased.

8. A power factor correction circuit for improving a power factor of a switching power supply, wherein said switching power supply is composed of said power factor correction circuit and a converter with a secondary winding and a primary winding coupling with a switching device, said circuit comprising:
   a winding with an opposite polarity to said primary winding, wherein said winding, said secondary winding and said primary winding are wound in a same core.;
   a diode with a p-type side and a n-type side, wherein said p-type side is coupled with said winding;
   an inductor coupled with said n-type side of said diode; and
   a capacitor coupled with said inductor, wherein said winding, said diode, said inductor and said capacitor are coupled in series, and said capacitor and said inductor have a common node connected with said primary winding.

9. The power factor correction circuit of claim 8, wherein said inductor is used to filter noise.

10. The power factor correction circuit of claim 8, wherein the ratio of the number of the turns of said winding to said primary winding approaches 1.

11. The power factor correction circuit of claim 8, wherein said switching device controls said capacitor to charge said primary winding.

12. The power factor correction circuit of claim 8, wherein said capacitor is charged when said diode is forward-biased.

13. The power factor correction circuit of claim 8, wherein a power is transferred to said secondary winding through said primary winding when said diode is reverse-biased.

* * * * *